May 20, 1969
R. W. STENZEL
3,445,376
ELECTROFILTER
Filed Dec. 1, 1966
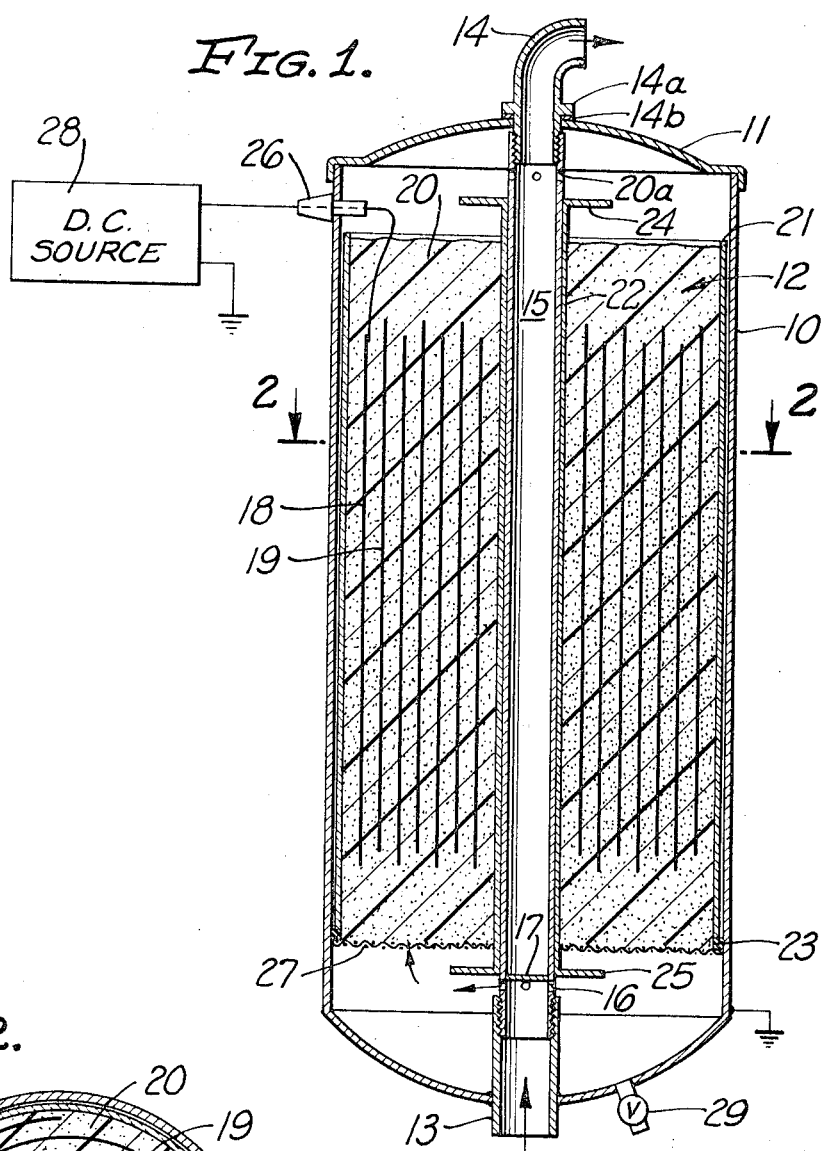
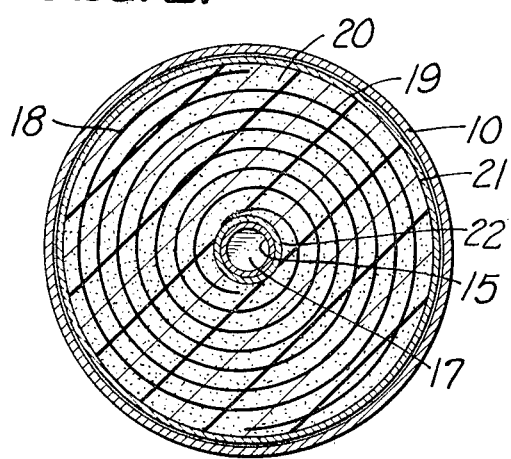
INVENTOR
RICHARD W. STENZEL United States Patent Office 3,445,376
Patented May 20, 1969

3,445,376
ELECTROFILTER
Richard W. Stenzel, 1880 McKinney Way, Apt. 20–H, Seal Beach, Calif. 90740
Filed Dec. 1, 1966, Ser. No. 598,299
Int. Cl. C10g *33/02;* B01d *13/02*
U.S. Cl. 204—302     3 Claims This invention is concerned with a useful and efficient type of electrofilter for the removal of liquid and solid particles from oil streams. Its structural features and the simple manner in which it can be manufactured provides an article of commerce having considerable value because of its economic features.

The ever-increasing demand of industry for greater purity of products such as mineral and other oils has made it necessary for the manufacturer to seek more efficient means for accomplishing these results. Numerous devices have been suggested, and some of the most effective are those in which electric fields are used in conjunction with a highly porous foam material, the electric field causing the impurities to be held by the foam and thus removing them from the oil. My prior U.S. Patent 3,117,920 describes an electric field for treating oil in which the electrodes have a relatively close spacing.

An object of the invention is to provide a novel method of constructing a close-spaced electrode in which a dielectric porous material serves to space the oppositely charged electrodes from each other.

It is a further object of the invention to provide a filter for moving impurities from oil streams in which a pair of electrodes constructed of metallic foil are in close proximity and insulated from each other by a porous dielectric medium which is in the shape of a sheet placed between said electrodes, this assembly being rolled about an axis to form a cylinder providing alternately charged helical layers of electrode material.

It is a further object of the invention to construct a rolled cartridge of the above-described electrode system, which can be removably placed in a container to form a commercially adaptable filter package.

It is a further object of the invention to provide means to direct an oil flow through the above-mentioned electrofilter in a non-bypassing manner.

It is an object of the invention to provide an electrofilter capable of subjecting an oil to a high potential gradient from a relatively low voltage source.

The following description of one embodiment of the invention indicates the novel features involved.

FIGURE 1 is a vertical section of the invention. FIGURE 2 is a horizontal cross-section taken approximately through the center of FIGURE 1. The housing 10 in the figures has a removable cover 11 to facilitate the removal and replacement of the filter cartridge 12 with a short inlet pipe 13 for conducting the oil to be purified to the filter medium and an outlet pipe 14 at the upper end of the filter cartridge. The upper portion of the inlet pipe is threaded for connection to the center standpipe 15 which acts as a guide for properly positioning the cartridge 12 in the housing. A baffle 17 prevents oil from flowing through the standpipe during operation. Fitting over the standpipe and in sliding contact with it is the tubing 22 which is an integral part of the filter cartridge and acts as its central support and means for handling it. Near the bottom of the tubing 22 are peripheral inlet holes 16. These inlet ports may also be formed by serrating the lower extremity of the tubing 22. Thus the incoming oil flows into the lower portion of the filter container and upwardly through the filter itself. The upper end of the standpipe 15 extends close to the cover 11 and is threaded to mate with the inner threaded portion of the outlet pipe 14. Liquid-tight seal between cover and housing is obtained by tightening the nut 14a against the gasket 14b, sealing it to the cover 11.

The filter cartridge 12 completely occupies the cross-section of the housing so that all of the incoming oil must pass through the electric field formed by the alternate electrodes 18 and 19 spirally wound between layers of the dielectric material 20 which fills the space between the electrodes and extends beyond them at both ends in order to insulate them from any contact of the electrodes with external materials which might either distort or short circuit these electrodes. It may be noted that there are small areas detectable in the cross-section, at the beginning and end of the electrode spirals, where there are no electric fields. If these areas are appreciable fractions of the total cross-sectional area, passage of fluids through such passages may be prevented by baffling them at the bottom or top ends or at both, or foam having closed cells may be used in those regions.

The oil passes upward through the electrode system until it reaches the upper portion of the vessel where it exits through ports 20a on the periphery of the upper portion of the standpipe 15 and thence flows outside of the cartridge through the outlet tubing 14. The removable cartridge is bounded by the cylinder 21 on its outer side and by the tubing 22 at its center. The outer cylinder has a close fit to the housing to prevent bypassing between them, and bypassing is further hindered by the ring gasket 23 between the lower edge of the cylinder 21 and the perforated plate 27 upon which the cartridge rests. The inner cartridge tubing 22 has doughnut-shaped disks 24 and 25 which act to distribute the in-and-out moving oils evenly across the surface of the cartridge, thus providing for essentially uniform flow throughout its cross-section. Direct current is introduced into the casing from the source 28 by means of a wire passing through the insulating bushing 26 which wire in turn is connected to the lead-in wire attached to the high voltage electrode of the assembly. The grounded electrode is directly connected to the inner tubing 22 or outer tubing 21 or to both, the casing being grounded for safety and to provide proper voltage gradients between the electrodes. A device for withdrawing any settled material or draining the vessel is provided by the valve 29. An important feature of the cartridge is the spacial relationship between the foam material 20 and the two oppositely charged electrodes 18 and 19.

The voltage is preferably introduced into the filter cartridge in the form of direct current of medium voltage, depending prmarly on the nature of the materal to be treated and the spacing of the electrodes. Commonly, it is desirable to have a gradient of approximately 1,000–10,000 volts per inch but it is often necessary to tailor its magnitude to the system involved, which is common practice in this art.

A typical example of the structural features of electrodes is one in which layers of say urethane plastic foam sheets having dielectric properties and a high percentage of voids alternate with layers of aluminum foil. This is readily accomplished by placing aluminum foil upon a layer of plastic foam, superimposing thereupon another layer of foam and then another of aluminum foil. It is important that the ends of the foam layers project laterally well beyond the ends of the electrode layers because in this way protection is afforded against disturbance of the electrode spacing or deformation of the electrodes. Furthermore, it is essential that the aluminum foil be thin and flexible enough so that the configuration of the wrapped system is determined, not by the pliability of the foil but rather largely by that of the foam. Thus it is desirable to utilize foil such as aluminum foil of a thickness commonly used for household purposes, which is generally of the order of a mil or so. If the foil is too thick, the foam, being quite flexible, will be excessively distorted by the forces involved in wrapping the cylinder and consequently equal spacings along the entire electrode length cannot be achieved. The wrapping process should be such that the foam is lightly compressed so that the final assembly will be firm and unitized. In this way it can be readily handled for shipping and installation purposes. The degree of compression required to accomplish this varies somewhat with the physical properties of the foam and electrode materials, but it is usually between 1 and 10% of the original undistorted thickness. Some foam materials are, of course, more resistant to distortion than others and will tolerate a foil of somewhat greater thickness. It is obvious that in order to achieve the best structural system, the dielectric material is preferably in the form of sheets of quite porous nature so that it can be adapted to the construction described. I have found that this type of structure is very satisfactory and appropriate for use in electric filtration and lends itself well to the application of a cartridge filter which can be readily removed from the casing for replacement, thus minimizing the time and cost involved in such replacement procedure.

It can readily be seen that the thickness of the dielectric layers between the electrodes determines the spacing of said electrodes and it is the object of the invention to provide relatively close spacing in order to increase the effectiveness of the contaminant removal process. Furthermore, close spacings make is possible to obtain high gradient electric fields without making it necessary to go to the high applied voltages commonly used in present commercial electric treating operations. It is desirable however to avoid spacings that are too narrow, since then the particles deposited in the dielectric layers may soon build up to aggregates sufficiently large to bridge the electrode gap and thus cause short circuiting of the system. I prefer to use gaps not smaller than about ⅛ inch and not larger than about 1 inch. The types of dielectric materials which I prefer to use are flexible foamed plastics in the form of sheets which may be cut to the desired lengths.

In order to avoid the concentrated high gradients which tend to appear at the upper and lower edges of the thin electrodes described, it is desirable to turn the metal back upon itself at these edges, thus reducing the gradients and the possibility of local flashovers.

I do not wish to be limited to the particular embodiment I have chosen to describe the electric filter apparatus. For example, the design shown may be modified to permit the oil-flow to be downward rather than upward as illustrated. Similarly, the spacial relationships of the various elements of the filter may be altered to accommodate the requirements of a particular system or installation.

I claim as my invention:

1. An electrofilter for the removal of liquid and solid particles from oils of relatively low conductivities, comprising a spirally wrapped assembly of two oppositely charged electrodes utilizing a pliable porous organic filter medium to insulate and separate the electrodes from each other, said electrodes being constructed of metallic foil sufficiently thin and flexible so as to exert only slight distorting forces on the filter medium in the spirally wrapped state, said filter medium completely occupying the interelectrode space and extending longitudinally beyond the electrodes to protect them from external handling distortions and contact with each other and with external objects; conducting means for attaching one of said electrodes to an electric power source and the other to ground; means for establishing a high unidirectional voltage gradient between said electrodes, encasing means for said assembly having appropriate inlet and outlet passages, and sealing means for permitting flow of said oils longitudinally through said assembly in a non-bypassing manner.

2. An electrofilter as in claim 1, in which the separation of the electrodes is in the range of approximately ⅛ inch to 1 inch.

3. An electrofilter as described in claim 1 in which the edges of the electrodes are folded back upon themselves to reduce the electric gradient at these edges.

References Cited

UNITED STATES PATENTS

| | | | |
|---|---|---|---|
| 2,033,129 | 3/1936 | Eddy | 204—305 |
| 2,072,917 | 3/1937 | Woelfin | 204—305 XR |
| 2,872,408 | 2/1959 | Waterman et al. | 204—302 |
| 3,117,920 | 1/1964 | Stenzel | 204—302 |
| 3,186,933 | 6/1965 | Gupner | 204—302 |

HOWARD S. WILLIAMS, *Primary Examiner.*

D. R. JORDAN, *Assistant Examiner.*

U.S. Cl. X.R.

204—272, 282